United States Patent [19]

Dreschler

[11] Patent Number: 5,104,629

[45] Date of Patent: Apr. 14, 1992

[54] PROCESS FOR REMOVING CARBON-CONTAINING OR NITROGEN OXIDE-CONTAINING POLLUTANTS IN FLUE GASES

[75] Inventor: Daniel Dreschler, Würzberg, Fed. Rep. of Germany

[73] Assignee: KRC Umwelttechnik GmbH, Wurzburg, Fed. Rep. of Germany

[21] Appl. No.: 561,590

[22] Filed: Aug. 2, 1990

[30] Foreign Application Priority Data

Apr. 2, 1990 [DE] Fed. Rep. of Germany ....... 4010566

[51] Int. Cl.$^5$ ................. B01J 8/00; C01B 21/00; C01B 31/18; C07C 11/24
[52] U.S. Cl. ................. 423/239; 423/245.1; 423/247
[58] Field of Search ............ 423/235, 235 D, 239 A, 423/247, 245.1, 239

[56] References Cited

U.S. PATENT DOCUMENTS

| | | | |
|---|---|---|---|
| 4,026,992 | 5/1977 | Shiga et al. | 423/239 |
| 4,160,805 | 7/1979 | Inaba et al. | 423/239 |
| 4,220,663 | 9/1980 | Pirsh | 423/239 |

Primary Examiner—Gregory A. Heller
Attorney, Agent, or Firm—Wegner, Cantor, Mueller & Player

[57] ABSTRACT

A process for the removal of carbon-containing or nitrogen oxide-containing pollutants in low-dust flue gases by catalytic reduction, which is characterized in that a reducing agent is injected through nozzle(s) into the intermediate space of one stage of the economizer, said reducing agent is mixed with the low-dust flue gas in the tube bundles of the economizer, and the resultant reduction flue gas mixture passes catalyst layers located downstream of the economizer at a local velocity greater than 6.5 m/s.

6 Claims, 1 Drawing Sheet

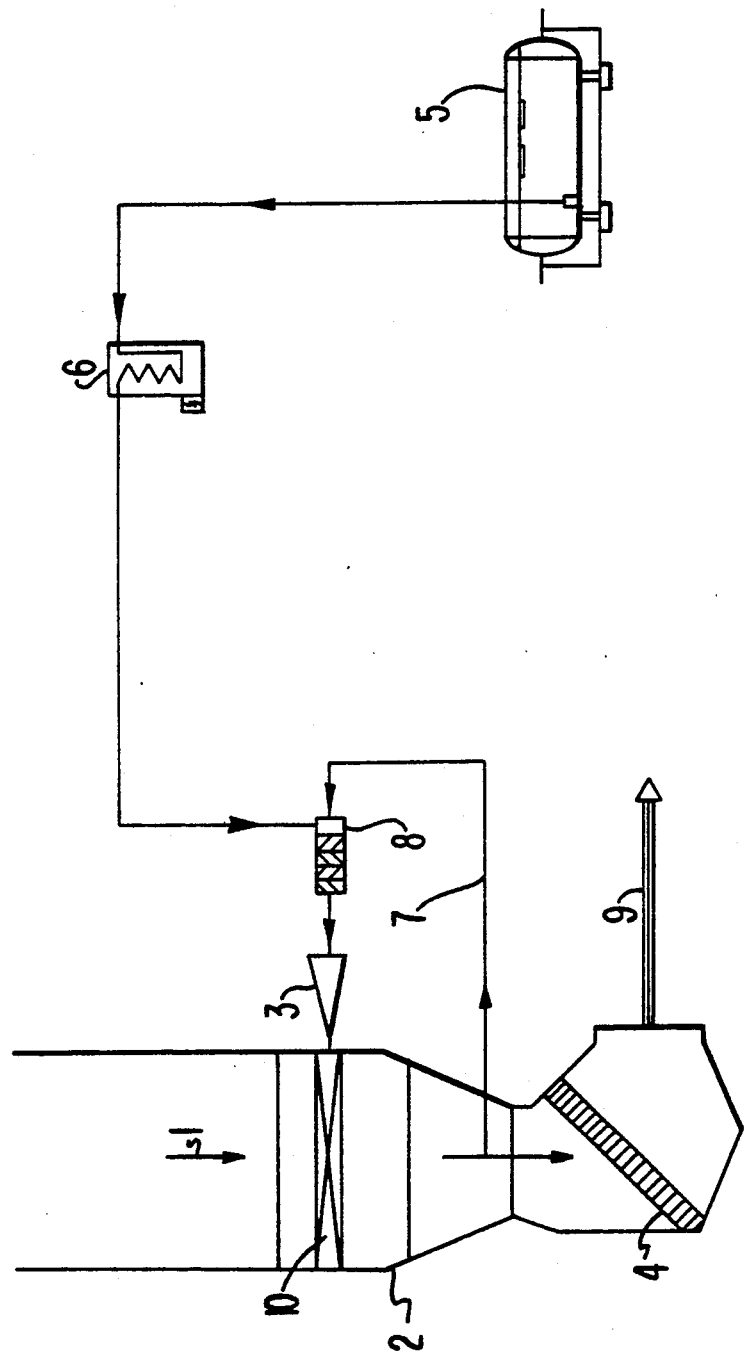

PROCESS FOR REMOVING CARBON-CONTAINING OR NITROGEN OXIDE-CONTAINING POLLUTANTS IN FLUE GASES

The present invention relates to a process for the removal of carbon-containing or nitrogen oxide-containing pollutants in low-dust flue gases by catalytic reduction.

Low-dust flue gases are formed upon high temperature heating or combustion of substrates. Thus, it has been known that nitrogen oxides can be formed from nitrogen and oxygen at temperatures in excess of 1,500° C. Further, if carbon-containing substrates are used, carbon-containing pollutants are additionally formed, for example carbon monoxide, and hydrocarbons can contaminate the flue gas also. Purification of the contaminated flue gases has been effected in that the flue gas is taken out downstream of the economizer located on the boiler, and in a separate process step, is introduced into a reactor together with a reducing agent. Subsequently, the flue gas is passed over a suitable catalyst, where the pollutants are largely removed from the flue gas.

This kind of purification in a separate process step requires additional expenses in equipment and operation and implicates considerable costs.

Therefore, there is a great demand for a process which allows these carbon-containing or nitrogen oxide-containing pollutants in low-dust flue gases to be removed in one single process step and, thus, provides an easier and more economical process for the flue gas purification. Furthermore, it is necessary to mix the reducing agent and the flue gas such as to form a mixture which is as homogenous as possible and sufficient for obtaining the desired reaction.

This object has been attained with a surprisingly simple process according to the present invention.

BRIEF DESCRIPTION OF THE DRAWINGS

The FIGURE schematically illustrates the process according to the present invention.

DESCRIPTION OF THE PREFERRED EMBODIMENTS

As seen in the FIGURE, a low-dust flue gas 1 enters economizer 2. A reducing agent is injected into the intermediate space of one stage 10 of the economizer 2 through at least one injection nozzle 3, the reducing agent is mixed with the low-dust flue gas in the tube bundles of the economizer 2, and the resultant reduction flue gas mixture passes catalyst layers 4 located downstream of the economizer 2 at a local velocity greater than 6.5 m/s.

As the reducing agent there may preferably be used ammonia or ammonia-forming compounds. As shown in the FIGURE, the reducing agent can be stored in a storage tank 5 and passed through an evaporator 6 prior to injection into the economizer 2.

In a particularly preferred embodiment, the catalyst layers 4 are arranged diagonally in relation to the direction of the flue gas stream. Then, in the first layer a decrease in nitrogen oxides occurs, whereas in the second layer the carbon-containing pollutants are reduced. As the carbon-containing pollutants, carbon monoxide and hydrocarbons may be contained in the flue gas. As the catalysts, suitable catalysts known from prior art are employed.

After passing over the catalyst layers 4, the reduced exhaust flue gas 9 exits the system.

In a further embodiment, part of the heated flue gas may be recirculated in the flue gas as recirculation stream 7, and mixing of the reducing agent with the flue gas may be additionally effected in the recirculation stream 7 with mixing means 8.

The economizer 2 is a heat exchanger and serves to pre-heat the boiler feed water. It contains bundles of tubes arranged in several levels whereby the heat is exchanged. Due to the jet-injection of the reducing agents into the gaps of the economizer, in the subsequent tube bundle layer located further downstream, the reducing agent is sufficiently mixed with the flue gas for the following catalytic reduction.

In a further embodiment, prior to the removal of the carbon-containing or nitrogen-containing pollutants, a selective non-catalytic process may be additionally employed in the boiler for reducing the pollutant contents. In a preliminary step prior to the use of the process according to the invention, the NH$_3$ and the CO emission may be reduced. This additional treatment is preferred for pollutant-rich flue gases.

Additionally, it is necessary for the process according to this invention that the flue gas has a low dust content so that damage to the catalyst will be avoided.

According to the present invention, a highly homogeneous mixture of the reducing agent and the flue gas is produced. Jet-injection of the reducing agent and subsequent mixing with the flue gas is not performed in a separate process step requiring additional expenses, but it is carried out in an economizer already present in the plant.

What is claimed is:

1. A process for the removal of nitrogen oxide-containing pollutants from a low-dust flue gas, said process comprising:
   (A) injecting a reducing agent with an injection nozzle into a stage of an economizer;
   (B) mixing the reducing agent with the low-dust flue gas in tube bundles of the economizer to form a mixture of the low-dust flue gas nd the reducing agent; and
   (C) passing said mixture over catalytic layers located downstream of the economizer at a velocity greater than 6.5 m/s, whereby said pollutants are removed.

2. The process according to claim 1, wherein the reducing agent comprises at least one of ammonia or ammonia-forming compounds.

3. The process according to claim 1, wherein the catalytic layers are arranged diagonally in relation to a direction of flow of said mixture.

4. The process according to claim 1, wherein carbon-containing pollutants are additionally removed from said low dust flue gas by said catalytic layers, said carbon-containing pollutants comprising at least one of carbon monoxide or hydrocarbons.

5. The process according to claim 4, additionally comprising a step of non-catalytically reducing the level of said nitrogen oxide-containing or carbon-containing pollutants in the low-dust flue gas in a boiler, said additional step being performed prior to step (C).

6. The process according to claim 5, wherein said additional step of reducing the level of said pollutants is performed prior to step (A).

* * * * *